(No Model.) 2 Sheets—Sheet 1.
G. B. WEBB.
TYPE WRITING MACHINE.
No. 480,641. Patented Aug. 9, 1892.
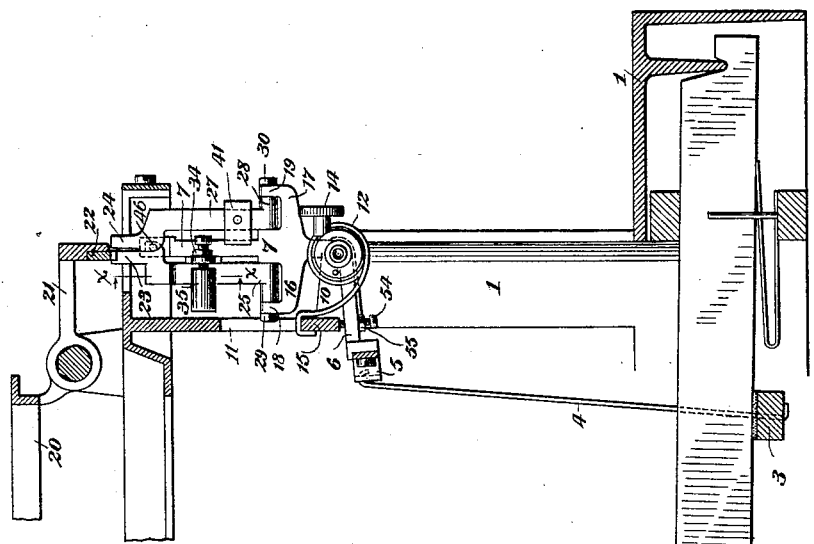
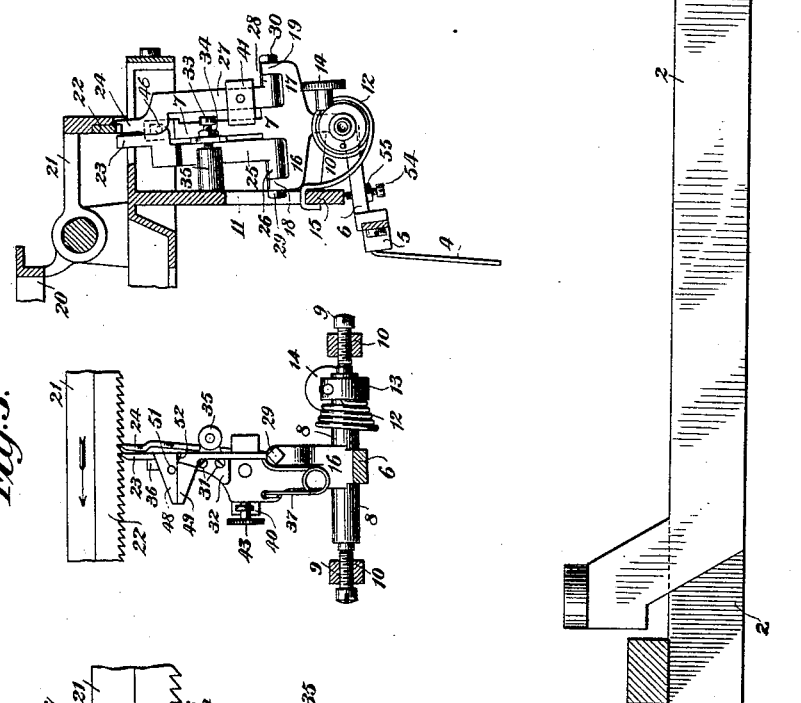
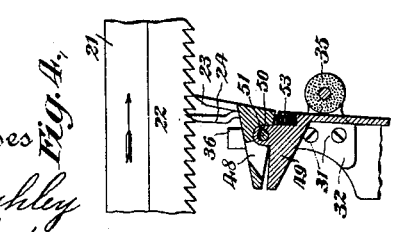
Witnesses
C. E. Ashley
H. W. Lloyd
Inventor
George B. Webb
By his Attorney
H. D. Donnelly (No Model.) 2 Sheets—Sheet 2.
G. B. WEBB.
TYPE WRITING MACHINE.
No. 480,641. Patented Aug. 9, 1892.
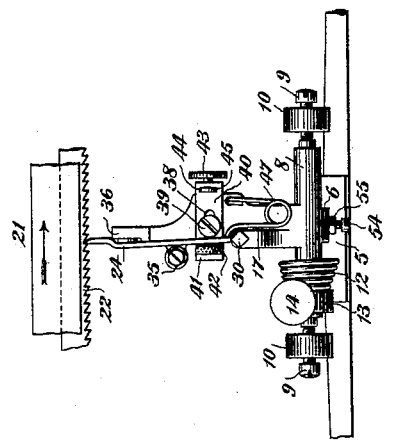
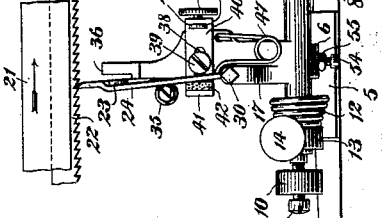
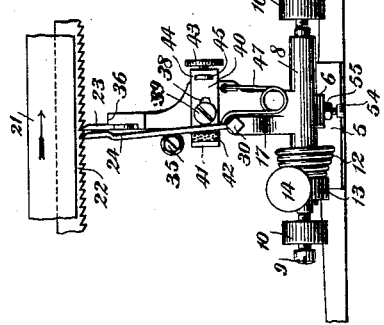
Witnesses
C. E. Ashley
I. W. Lloyd.
Inventor
George B. Webb
By his Attorney
H. D. Donnelly

UNITED STATES PATENT OFFICE.

GEORGE B. WEBB, OF NEW YORK, N. Y., ASSIGNOR TO THE REMINGTON STANDARD TYPE WRITER MANUFACTURING COMPANY, OF SAME PLACE.

TYPE-WRITING MACHINE.

SPECIFICATION forming part of Letters Patent No. 480,641, dated August 9, 1892.

Application filed September 28, 1891. Serial No. 406,997. (No model.)

*To all whom it may concern:*

Be it known that I, GEORGE B. WEBB, a citizen of the United States, and a resident of New York city, in the county of New York and State of New York, have invented certain new and useful Improvements in Type-Writing Machines, of which the following is a specification.

In an application for patent filed by me December 26, 1890, Serial No. 375,787, is shown and described what I designate a "reversed" carriage-feeding mechanism, which may be defined as one in which the spacing devices are so arranged that the carriage is released so as to be in motion or transit during the time the type makes its impression, in contradistinction to that arrangement in which the carriage is released after the impression has been made.

My present invention relates, also, to reversed carriage-feeding mechanism. If the front "detaining-dog" (or that nearest the operator) or that dog which stands in engagement with the feed-rack in the normal or unused condition of the carriage be made fast, rigid, or unyielding and the keys be struck very rapidly, said dog is liable to hit against the side of a tooth of the rack in returning to normal position, if through want of proper driving tension or want of time to travel the paper-carriage should fail to move the proper distance before said dog starts to return, and should said dog strike the side of a tooth instead of passing into the space between two teeth the return movement of the dog will be stopped, and if the next key be struck at this instant said dog will be moved back to its abnormal position before the loose or spacing dog has left the rack and while the carriage is moving the letter-space distance, with the result that the carriage stops at the instant the second letter is printed and cannot feed a letter-space thereafter as it should, although when the finger-key is released the fast dog returns in engagement with the rack. The effect of this irregular condition of the parts shows itself in the printing of the next letter, which strikes upon or over the preceding or second letter printed. In other words, if "a" be printed and the fast dog in returning collides with the side of a tooth instead of passing into the next space or notch, said dog will be arrested before the carriage has made a full letter-space. If "b" be struck at this moment, the fast-dog will move frontwise again and the carriage, with the spacing-dog in the rack, will complete the letter-space before "b" can print, and the letter-space between "a" and "b" will be all right. At this time, however, the spacing-dog will be in the rack and stopped or at the limit of its throw toward the left, and the printing of "b" was done after the stoppage of the carriage or at the end of the feed for "a." As soon as the finger is taken off of key "b" the detaining-dog passes into the notch just occupied by the spacing-dog, and hence there is no feed of the carriage after "b" is printed, and if key "c" be now struck the carriage will be released, but the type "c" will print on top of "b," since the carriage just starts to move or moves only slowly at the time of impact of the type.

My invention has for its main object to provide a construction of reversed feed in which this objectionable action cannot take place; and to this end it consists in the features of construction and combinations of devices hereinafter more fully described, and particularly pointed out in the appended claims.

In the accompanying drawings, Figure 1 is a central vertical section of a portion of a "Remington" type-writing machine with my invention applied thereto. Fig. 2 is a similar view omitting the lower portion of the machine, with the dogs in their shifted or unusual position, to which they are moved to release the carriage. Fig. 3 is an elevation, partly in section, looking from the front of the machine. Fig. 4 is a vertical section taken at the line *x x* of Fig. 1, looking rearwardly. Fig. 5 is a rear elevation with the dogs in their normal positions, as at Fig. 1. Fig. 6 is a similar view with the dogs in their abnormal positions and taken to illustrate their action at the instant the front dog is moved out of the rack and the rear dog moved in and before the carriage-feed. Fig. 7 is a similar view with the dogs in their abnormal positions at the end of the carriage-feed, as at Fig. 2.

In the several views the same part will be found designated by the same numeral of reference.

1 represents the framework of a type-writing machine, and 2 one of the key-levers thereof. Beneath the key-levers, as usual, and extending transversely of the machine, is a universal bar 3, connected at each end by a rod 4 to a cross-bar 5, which is screwed to a horizontal rocker-arm 6, made integral with a dog holder or support 7, provided with lateral trunnions 8, which are supported pivotally by screws, pins, or journals 9, arranged in lugs 10, extending rearwardly from a depending framework 11. Around one of the trunnions is arranged a coiled spring 12, one end of which is attached to a collar 13, having a tension-adjusting screw 14, and the other end of which is hooked over a cross-bar 15 at the lower end of the frame 11, the said spring operating to return the dog-holder, dogs, &c., to their first position after releasement of the finger-key.

At or near the base of the dog holder or support 7, and formed integral therewith, preferably, are two brackets or arms 16 and 17, terminating in upwardly-projecting ears 18 and 19, which are preferably perforated in line and coincident with a peforation in the dog-holder for the passage therethrough of a pivot-pin, as will be presently explained.

The paper-carriage 20 is provided with a hinged frame 21, to which is attached a vertically-arranged feed-rack 22, with which engage, alternately, two dogs 23 and 24.

The dog 23 I denominate the "holding" or "detaining" dog, as it serves to arrest or stop the paper-carriage 20 when in engagement with the feed-rack, and the dog 24 I call the "spacing" or "feeding" dog, as its office is to co-operate with the feed-rack in a manner to govern the actual feed or letter-space movement of the carriage.

The dog 23 is provided with a shank 25, which terminates in a lateral tubular bearing 26 at the bracket 16, and the dog 24 is also formed with a shank 27, which likewise terminates in a similar bearing 28 at the bracket 17. Through said bearings 26 and 28 and the coinciding perforations before referred to is passed a long pivot-pin, which is threaded at each end exteriorly of the arms 18 and 19 and provided with retaining-nuts 29 and 30, one of which, however, may be formed integral with the pin or bolt. In lieu of this construction the bearings 26 and 28 may be provided with separate or independent pivots.

Upon the dog holder or support 7 is attached by screws 31 a plate 32, which passes between the detaining-dog 23 and the front side of the dog-holder and extends beyond these devices in the direction of the right-hand side of the machine, (viewed from the front or the operator's working position,) and is provided at its free end with a threaded perforation to receive a screw 33 on the right-hand side of the shank 25 and at right angles thereto. Upon said screw is mounted a locking-nut 34 and a leather or other cushion 35, which forms an adjustable stop for the spacing-rocker or dog-holder in its forward vibration or when moving in a direction toward the operator, the cushion 35 striking the frame 11 and limiting the movement of the parts. The upper end of the dog holder or support 7 is cut away to form a stop 36 for the dog 23 in its vibration toward the left. A wire spring 37, attached at one end of the support 7 and at the other end to the shank 25, is provided to move the dog 23 toward the right.

Upon the rear side of the dog-holder 7 is mounted adjustably by a slot 38 and screw 39 a right-angled plate or bracket 40, the rearwardly-projecting member 41 of which is provided with a leather or other cushion-stop 42 for the dog 24 in its vibratory movements toward the right. The bracket 40, carrying the stop 42, is preferably made adjustable to govern the amount of vibration of the dog 24 about its pivot and by means of a screw 43, supported in the dog-holder and carrying a collar or nut 44, which enters a slot 45 in the bracket 40 and moves the latter and the stop 42 back or forth in accordance with the direction in which the screw 43 is turned.

The dog 23 is overlapped by the dog 24 in a manner such that the former may be carried by the latter when moving toward the left with the carriage. This overlapping or arrangement to have the dog 23 moved with and by the dog 24 during the feed of the carriage is important and obviously may be accomplished in various simple ways. I prefer that illustrated, which consists in providing the dog 23 with a tongue or lip or portion 46 to stand between the base of the dog 24 and the upper end of the dog-holder 7. This construction may also be properly described as one in which the dog 24 is provided with a lip or portion overlapping or lying behind the dog 23, and of course this construction may be provided at any suitable locality between the pivots of the dogs and their working faces. The stop 36 also serves as a stop (through the part 46, for the dog 24 in its movements toward the left. The dog 24 is provided with a wire spring 47, connected in the manner of the spring 37 and having a tension in the same direction to move the shank of the dog 24 against the stop 42.

The dog 23 may be jointed to its shank to enable the carriage to be returned noiselessly and without undue wear on the rack or dog, and as I prefer this construction in practice I have shown the same herein; but it will be understood that as far as the main feature of my invention is concerned the dog and its shank may be made rigid, integral, or unjointed.

In the jointed construction illustrated the dog 23 is provided with a tail-piece or extension 48, projecting toward the left, and the shank 25 is provided with a similar device 49, having a lug 50, which extends up into the slot in the part 48, through which passes a pivot-pin 51. The tail-piece 49 is cut away or beveled at 52 to form a gap or space to enable the dog to vibrate independently to the right, as illustrated at Fig. 4. In a housing in the shank 25 is a spiral 53, the upper end of which bears against the part 48 to return the dog to normal position after vibration by the rack in returning. The dog 23 is incapable of any independent movement toward the left beyond the plane of its shank by reason of the contact or closing of the jaw-like ends of the parts 48 and 49.

In the rocker-arm 6 is arranged a screw 54, having a locking-nut 55, by which means the return movement of the spacing-rocker may be regulated, the point of the screw being arranged to strike the lower side of the frame 11.

Having sufficiently described the construction of a type-writing machine embodying my improvements, I shall now proceed to explain the mode of operation thereof. At the outset it is to be presumed, of course, that the paper-carriage is connected with the usual or some suitable driving power—such, for instance, as the spring-drum of the Remington machine—whose action is to pull the carriage always toward the left. This driving mechanism, as well as other parts, is omitted to simplify the drawings and because they are well understood. At Figs. 1, 3, and 5 the dogs are shown as in their normal positions—that is to say, with the dog 23 in engagement with the rack and standing against the stop or abutment 36, thus detaining the carriage against the pull of the driving power, and with the dog 24 standing in rear of the rack with its shank against the back stop 42 and with its working edge in line with the space next behind or to the right of that engaged by the detaining-dog. If a finger-key be struck now, the universal bar will be depressed, the rocker-arm 6 pulled down, and the dog-holder, with its appendages, vibrated toward the operator. During this forward movement of the dog-holder the dog 23 is rocked out of the rack and the dog 24 rocked into engagement therewith, but into a notch or space immediately behind that just occupied by the dog 23. As soon as the dog 23 leaves the rack and the dog 24 engages the same the driving power is free to move the carriage a letter-space distance. The instant the dog 23 leaves the rack the spring 37 forces it to the right against the overlapping part of the dog 24 and the driving power pulls the carriage one step or notch to the left. In this movement of the carriage the dog 24 is vibrated in the direction of the feed until arrested by the stop 36. The dog 24 in this movement carries along with it to the left the dog 23 in consequence of the overlapping of the dogs, and when the dog 24 and the carriage have come to a standstill the dog 23 lies in the plane of the dog 24, but outside of and in front of the rack, as indicated at Figs. 2 and 7. If the finger-key be released now, the spring 12 will return the rocker-arm and the dog-holder to first positi dog 24 will be rocked out of the rack and the dog 23 moved into the space of the rack just occupied by the dog 24, which latter alone by its spring 47 will be instantly moved to the right a letter-space against the stop 42, while the dog 23 is left in the rack and against the stop 36, as indicated at Figs. 1, 3, and 4, which is the normal condition of the parts. As explained, at the end of the feed movement the dog 24 stands in the rack and the dog 23 out, but edge to edge or in the same plane with the dog 24. By reason of this construction the dog 23 in returning to its initial position is obliged to pass into the notch which the dog 24 leaves and cannot collide with or strike against the side of a tooth, since the distance between the points of the dogs is less than the width of the teeth of the rack, and the dog 23 in returning to normal position moves into the notch partially before the dog 24 has entirely moved out of it. Thus no matter how rapidly the machine may be worked the objection previously pointed out cannot occur with the new construction and arrangement. By pivoting the detaining-dog 23 at 26 it vibrates to the right as soon as it leaves the rack and takes a position in line with the dog 24 and moves with it to the left during the feed of the rack, and hence is always in position to pass into the proper notch and can never strike against the side of a tooth.

As in my other application hereinbefore referred to, the carriage of this machine is released before the type strikes the paper and the printing is done while the carriage is in motion. The type movement may be of any construction, and the improvements are adapted equally for "wheel-machines."

What I claim as new, and desire to secure by Letters Patent, is—

1. In a type-writing machine, the combination, with a paper-carriage and a rack, of an independently-movable detaining-dog and an independently-movable spacing-dog, the detaining-dog being arranged to travel and stop in line with the spacing-dog during and at the cessation of the letter-space movement of the carriage, substantially as described.

2. In a type-writing machine, the combination, with a paper-carriage, a rack, and a vibratory dog-holder, of a vibratory spring-actuated detaining-dog and a vibratory spring-actuated spacing-dog, each having an independent movement toward the right and connected so that the detaining-dog must move toward the left with the spacing-dog, substantially as described.

3. In a type-writing machine, the combination, with a paper-carriage, a rack, and a vibratory dog-holder, of a vibratory spring-actuated detaining-dog and a vibratory spring-actuated spacing-dog overlapping the detaining-dog on the right-hand side, so as to carry the same in the feeding operation of the carriage, substantially as described.

4. In a type-writing machine, the combination, with a paper-carriage, a rack, and a vibratory dog-holder, of a vibratory spring-actuated detaining-dog, a stop in front thereof, an overlapping vibratory spring-actuated spacing-dog, and a stop arranged in rear thereof, substantially as described.

5. In a type-writing machine, the combination, with a paper-carriage, a rack, and a vibratory dog-holder, of a vibratory spring-actuated detaining-dog, a stop in front and a stop in rear thereof, an overlapping vibratory spring-actuated spacing-dog, and a stop arranged in rear thereof, substantially as described.

6. In a type-writing machine, the combination, with a paper-carriage, a rack, and a vibratory dog-holder, of a vibratory spring-actuated spacing-dog connected to move the detaining-dog toward the left and means for limiting the vibration in both directions of both said dogs, substantially as described.

7. In a type-writing machine, the combination, with a paper-carriage, a rack, and a vibratory dog-holder, of a detaining-dog pivoted on one side of said dog-holder, a spacing-dog pivoted on the other side of said dog-holder and overlapping the detaining-dog, a stop back of the spacing-dog, a stop in front of both said dogs, and a spring for each dog, having a tension toward the right, substantially as described.

8. In a type-writing machine, the combination, with a paper-carriage, a rack, and a vibratory dog-holder, of a pivoted spring-actuated detaining-dog having a pivotal joint and spring intermediate its ends and a pivoted spring-actuated overlapping spacing-dog, substantially as described.

9. In a type-writing machine, the combination, with a paper-carriage, a rack, and a vibratory dog-holder, of a vibratory spring-actuated detaining-dog normally in engagement with the rack and against a front stop and a vibratory spring-actuated spacing-dog normally out of the rack and out of line with the detaining-dog and against a back stop, the construction and arrangement being such that when the detaining-dog is rocked out of the rack the spacing-dog is rocked in, then the detaining-dog moves at first toward the right, then the carriage feeds, the spacing-dog and the detaining-dog traveling together in line toward the left with the feed of the carriage, and finally both dogs stop in line and with the spacing-dog in engagement with the rack, so that when the finger-key is released the spacing-dog shall rock out of the rack and the detaining-dog in and into the space just occupied by the spacing-dog, substantially as described.

10. In a type-writing machine, the combination, with the framework, of a vibratory dog-holder and an adjustable stop carried by the dog-holder to limit the forward movement of the dog-holder, substantially as described.

Signed at New York city, in the county of New York and State of New York, this 12th day of September, A. D. 1891.

GEORGE B. WEBB.

Witnesses:
SAMUEL D. OSBORNE,
JACOB FELBEL.